(12) United States Patent　(10) Patent No.: US 8,222,871 B2
Leboeuf　(45) Date of Patent: Jul. 17, 2012

(54) METHOD AND DEVICE FOR CHARGING AN ELECTRICAL ENERGY STORAGE ELEMENT, IN PARTICULAR AN ULTRACAPACITOR

(75) Inventor: Cedric Leboeuf, Creteil (FR)

(73) Assignee: Valeo Equipements Electriques Moteur, Creteil (FR)

( * ) Notice: Subject to any disclaimer, the term of this patent is extended or adjusted under 35 U.S.C. 154(b) by 524 days.

(21) Appl. No.: 12/304,188

(22) PCT Filed: May 3, 2007

(86) PCT No.: PCT/FR2007/051213
§ 371 (c)(1),
(2), (4) Date: Sep. 15, 2009

(87) PCT Pub. No.: WO2008/000978
PCT Pub. Date: Jan. 3, 2008

(65) Prior Publication Data
US 2010/0019737 A1　Jan. 28, 2010

(30) Foreign Application Priority Data
Jun. 29, 2006　(FR) ...................................... 06 52719

(51) Int. Cl.
*H02J 7/00*　(2006.01)
(52) U.S. Cl. ...................................................... 320/167
(58) Field of Classification Search .................. None
See application file for complete search history.

(56) References Cited

U.S. PATENT DOCUMENTS

| 6,118,678 | A | * | 9/2000 | Limpaecher et al. | ........... 363/60 |
| 6,320,358 | B2 | * | 11/2001 | Miller | ........... 323/222 |
| 6,469,481 | B1 | * | 10/2002 | Tateishi | ........ 323/282 |
| 6,580,180 | B2 | * | 6/2003 | Tamai et al. | ........ 307/10.1 |
| 6,882,130 | B2 | * | 4/2005 | Handa et al. | ........ 320/135 |
| 7,002,815 | B2 | * | 2/2006 | Scarlatescu | ........ 363/34 |
| 2003/0169022 | A1 | * | 9/2003 | Turner et al. | ........ 320/166 |
| 2006/0028778 | A1 | | 2/2006 | O'Gorman et al. | |

FOREIGN PATENT DOCUMENTS

FR　2 838 572　10/2003
WO　WO 01/89055　11/2001

* cited by examiner

*Primary Examiner* — Melissa Koval
*Assistant Examiner* — Robert Grant
(74) *Attorney, Agent, or Firm* — Berenato & White, LLC

(57) ABSTRACT

The device according to the invention for charging a first electrical energy storage element (1), in particular an ultracapacitor, from a second electrical energy storage element (2), in particular a battery, is of the type of those comprising a reversible DC/DC converter (3) arranged between the first and second elements (1,2). In accordance with the invention, the device moreover comprises a stepdown voltage converter (4) arranged between the DC/DC converter (3) and the first element (1). Advantageously, the device comprises means controlled (11,12,23) so as to charge with a low current the first element (1) from the second element (2), in particular a battery in a poor state of charge, so as to allow the starting of an engine of a motor vehicle even from a battery in a poor state of charge.

5 Claims, 4 Drawing Sheets

US 8,222,871 B2

METHOD AND DEVICE FOR CHARGING AN ELECTRICAL ENERGY STORAGE ELEMENT, IN PARTICULAR AN ULTRACAPACITOR

CROSS-REFERENCE TO RELATED APPLICATIONS AND CLAIM TO PRIORITY

This application relates to International Application No. PCT/FR2007/051213 filed May 3, 2007 and French Patent Application No. 0652719 filed Jun. 29, 2006, of which the disclosures are incorporated herein by reference and to which priority is claimed.

TECHNICAL FIELD OF THE INVENTION

The present invention relates to a method for charging an electrical energy storage element, such as an ultracapacitor, from another storage element, such as a battery.

The invention also relates to a charging device which is designed for implementation of the method, in particular on a motor vehicle dual voltage electrical energy supply network.

TECHNOLOGICAL BACKGROUND OF THE INVENTION

In a network of this type, the two storage elements have different nominal direct service voltages, and a reversible converter, which is better known to persons skilled in the art as a DC/DC[1] converter, arranged between the two elements, is necessary in order to carry out the transfers of energy from one to the other.

A known problem consists of the initial charging of the storage element which has the higher nominal voltage, by the other element, up to the nominal voltage of the latter.

The technical problem is particularly difficult to solve when the objective is to charge an ultracapacitor with several tens or even hundreds of Farads, from a 12V battery for example, since a very substantial initial current requirement may arise.

In general, this current can not be supplied by the DC/DC converter itself. An additional device is therefore used in order to carry out the initial charging.

The simplest known device consists of a resistor which is interposed between the two storage elements.

This simple solution has several disadvantages:
  if the resistor has a low ohmic value, in order to reduce the duration of the initial charging, then the charging current is substantial, which leads to use of a high-power, high-cost resistor;
  if a resistor is selected which has an acceptable value in terms of power dissipated, for example 1 ohm, then the duration of the charging becomes prohibitive (over 15 minutes);
  a resistor which is connected permanently between the elements leads to a substantial leakage current, and to discharge from one element to the other.

In patent application FR2838572, the company VALEO discloses a solution which eliminates the aforementioned disadvantages.

During the initial charging of the first element with the higher nominal voltage, this solution consists of putting what is known to persons skilled in the art as a stepdown voltage converter into service between the output of the second element with the lower nominal voltage and the input of the DC/DC converter, until the moment when the voltage at the terminals of the first element is equal to the nominal voltage of the second.

The stepdown voltage converter consists substantially of a static switch (better known to the person skilled in the art as "buck converter"), for example of a transistor of the "MOSFET" type, the duration of closure of which, relative to the duration of opening, makes it possible to control the mean charging current.

Since the transistor functions by switching, the disadvantage of the high level of thermal dissipation of the resistor is eliminated.

However, this solution also has the disadvantage of reducing the overall output of the energy transfer between the storage elements.

In fact, the stepdown voltage converter is used only in the initial stage of charging of the first element from the second element, when the voltage at the terminals of the first element is lower than the nominal voltage of the second element.

In the case of application for a motor vehicle, in which the first element is an ultracapacitor and the second element is a battery, this situation is infrequent.

Most of the time, the voltage at the terminals of the ultracapacitor is greater than that of the battery, and the static switch of the stepdown voltage converter constitutes an additional resistive charge in series which detracts from the performance of the system, even if this switch is permanently closed.

In addition, the filter which is placed upstream from the stepdown voltage converter, and is designed to filter the currents which are switched both by this stepdown voltage converter and by the DC/DC converter, must filter the cut-off caused by this converter of the stepdown voltage type, meaning that this filter must be oversized.

GENERAL DESCRIPTION OF THE INVENTION

The object of the present invention is thus to improve the known methods for charging a first electrical energy storage element, in particular an ultracapacitor, from a second electrical energy storage element, in particular a battery.

Since the first element has a first nominal direct service voltage and the second element has a second nominal direct service voltage which is lower than the first voltage, the charging method according to the invention is of the type which implements in a known manner a reversible DC/DC converter which is arranged between the first and second elements.

The method according to the invention is distinguished in that:
  when the charging voltage of the first element is lower than the second voltage, there is additionally put into service a stepdown voltage converter which is arranged between the DC/DC converter and the first element, and the DC/DC converter is put out of service;
  when the charging voltage of the first element is higher than, or the same as the second voltage, the stepdown voltage converter is put out of service, and the DC/DC converter is put into service.

Preferably, when the stepdown voltage converter is put into service, the charging current of the first element is controlled by means of a shunt, and by varying the cyclical ratio of a command signal of a first static switch which is arranged between the input and output terminals of the stepdown voltage converter.

Preferably, when the DC/DC converter is in service, the charging current of the first element is controlled by commanding alternately the opening and closure of a second and third static switch, which are arranged in the DC/DC converter and form a dividing bridge in parallel on the input terminals of the stepdown voltage converter, the mid-point of the bridge being connected to a first inductive resistor in series with the shunt.

Preferably, the DC/DC converter is put out of service by closing the second switch and opening the third switch.

Highly advantageously, discharge of the said first element is avoided by opening the first and second switches.

The invention also relates to a device for charging a first electrical energy storage element, in particular an ultracapacitor, from a second electrical energy storage device, in particular a battery, which is designed for implementation of the above-described method.

Since the first element has a first nominal direct service voltage, and the second element has a second nominal direct service voltage which is lower than the said first voltage, the charging device according to the invention is of the type comprising in a known manner a reversible DC/DC converter arranged between the first and second elements.

The charging device according to the invention is distinguished in that it additionally comprises a stepdown voltage converter which is arranged between the DC/DC converter and the first element, and switching and control means in order, when the charging voltage of the first element is lower than the second voltage, to put into service the stepdown voltage converter and to put out of service the DC/DC converter, and, when the charging voltage of the first element is greater than, or equal to the second voltage, to put out of service the stepdown voltage converter and to put into service the DC/DC converter.

Preferably, the stepdown voltage converter is formed by a first static switch arranged between the input and output terminals of the stepdown voltage converter, and by a diode which is arranged in parallel on the output terminals of this stepdown voltage converter.

Preferably, the DC/DC converter consists of a second and third static switch which form a dividing bridge in parallel on the input terminals of the stepdown voltage converter, the mid-point of this bridge being connected to a first inductive resistor in series with a shunt, and of a first capacitor in parallel on the dividing bridge.

In addition, highly advantageously, the charging device according to the invention comprises a first filter which is arranged between the second element and the DC/DC converter, and a second filter which is arranged between the stepdown voltage converter and the first element.

Preferably, the first filter is a π filter formed by a second inductive resistor, and a second and third capacitor.

The second filter is also preferably a low-pass filter formed by a third inductive resistor and a fourth capacitor.

Advantageously, the first and second filters each comprise a fuse which is in series respectively with the second and third inductive resistors.

It will also be noted that a charging device according to the invention which can equip a motor vehicle will advantageously be able to comprise controlled means for charging the first storage element with a low current from the second storage element, in particular a battery in a poor state of charge, in order to permit starting of a thermal engine of the vehicle even from a battery which is in a poor state of charge.

These few essential specifications will have made apparent to persons skilled in the art the advantages provided by the charging method and device according to the invention, in comparison with the prior state of the art.

The detailed specifications of the invention are given in the description which follows in association with the attached drawings. It should be noted that these drawings simply serve the purpose of illustrating the text of the description, and do not in any way constitute a limitation of the scope of the invention.

DESCRIPTION OF THE PREFERRED EMBODIMENT OF THE INVENTION

Figure 1A:
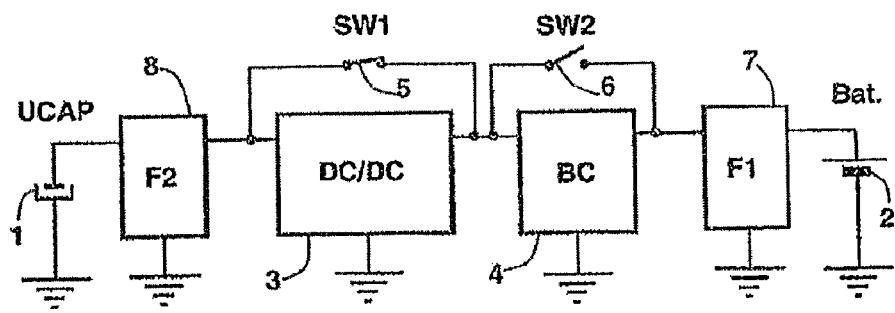
FIGS. 1a and 1b illustrate schematically a method, known from the state of the art, for charging an energy storage element from another element.

FIGS. 1a, 1b, 2a and 2b show schematically a first electrical energy storage element constituted by an ultracapacitor 1, which is associated with a second electrical energy storage element constituted by a battery 2.

On the electrical network on board a motor vehicle, the nominal direct service current at the terminals of the ultracapacitor 1 can vary for example from 14V to 28V, whereas the voltage at the terminals of the battery 2 is substantially 12V.

A reversible DC/DC converter 3 assures the transfer of energy between the two storage elements 1, 2, according to the electrical needs of the different units and accessories of the vehicle.

The problem with the initial charging of the ultracapacitor 1, which is also called "pre-charging" by persons skilled in the art, occurs when the objective is to charge this capacitor 1 to between 0V and the nominal voltage of the 12V battery 2, i.e. outside of the field of operation of the reversible DC/DC converter 3.

Figure 3:
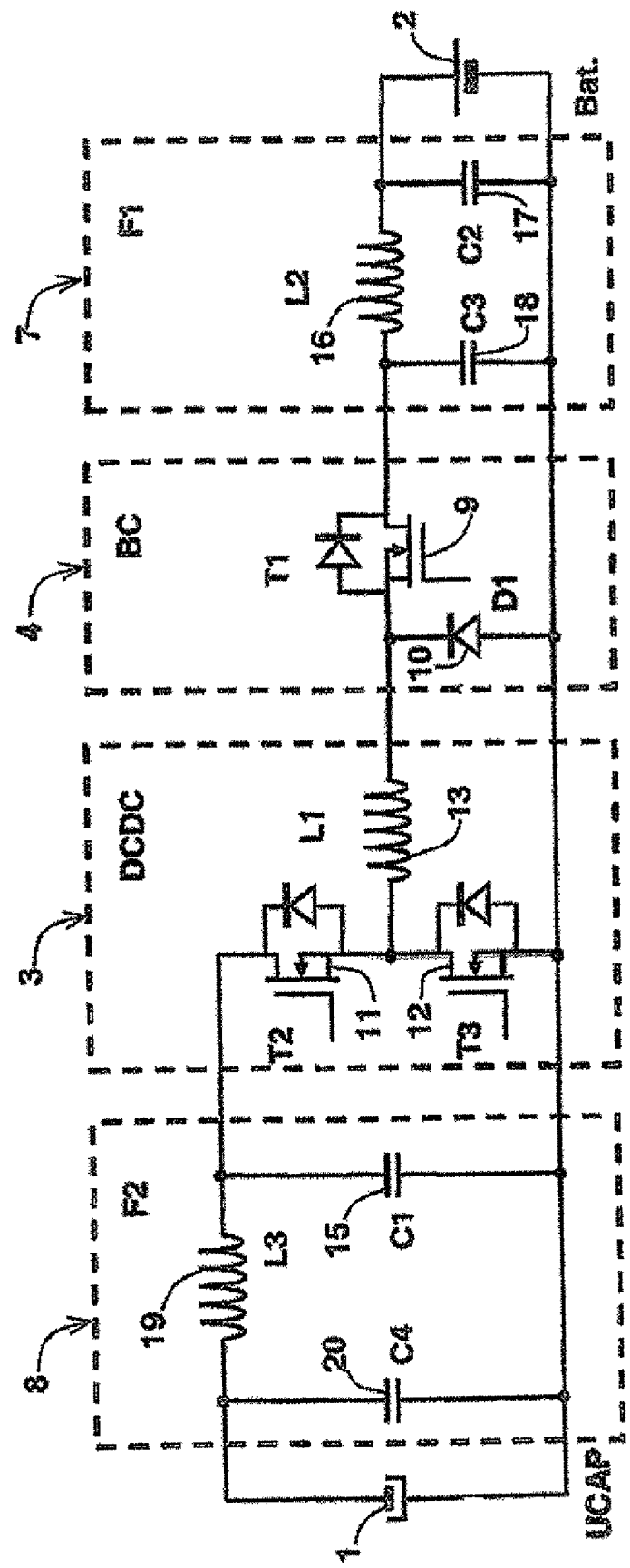
FIG. 3 represents the block diagram of a device, known from the state of the art, for charging an energy storage element from another element.

The solution already proposed by the company VALEO in application FR2838572, and illustrated in FIG. 3, consists of putting a stepdown voltage converter 4 into service between the battery 2 and the reversible DC/DC converter 3 during the pre-charging.

At the same time, the reversible DC/DC converter 3, which is then no longer of any use, is placed in a state which is as transparent as possible, i.e. virtually shunted, as symbolised in FIG. 1a by a first closed switch 5 which connects its input and its output.

During the pre-charging, the ultracapacitor 1 is thus supplied by the battery 2 and the stepdown voltage converter 4, the output voltage of which is controlled such as to limit the instantaneous charging current.

Figure 1B:
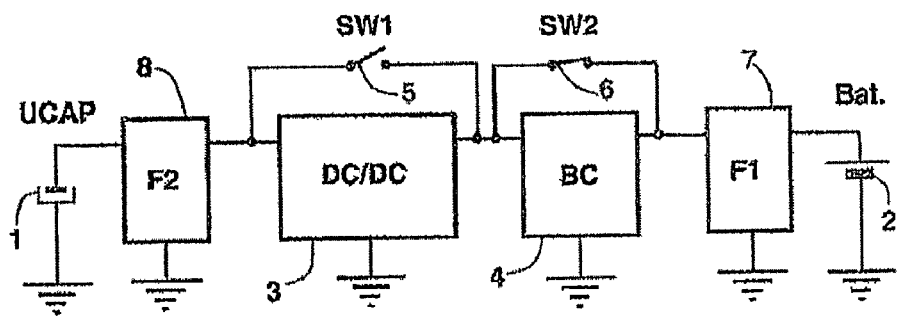

When the voltage at the terminals of the ultracapacitor 1 reaches the nominal voltage of the battery 2, the reversible DC/DC converter 3 is put back into service, as symbolised by the first open switch 5 in FIG. 1b.

The stepdown voltage converter 4 is placed in a state in which it has the lowest possible resistance in the circuit of the reversible DC/DC converter 3, as symbolised in FIG. 1b by the second closed switch 6 which connects the input and the output of the stepdown voltage converter 4.

The known method for transfer of energy between the ultracapacitor 1 and the battery 2 also implements low-pass filters 7,8 at the terminals of the storage units 1, 2, so as to filter the switched currents.

Figure 2A:
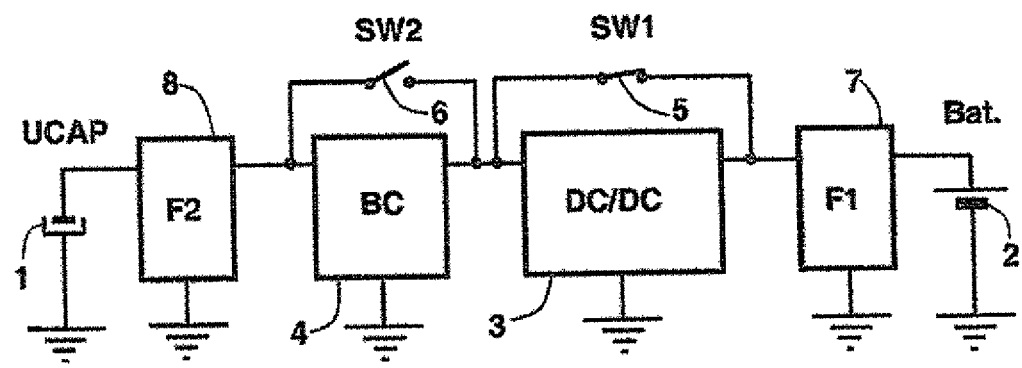
FIGS. 2a and 2b illustrate schematically the method according to the invention for charging an energy storage element from another element.
Figure 2B:
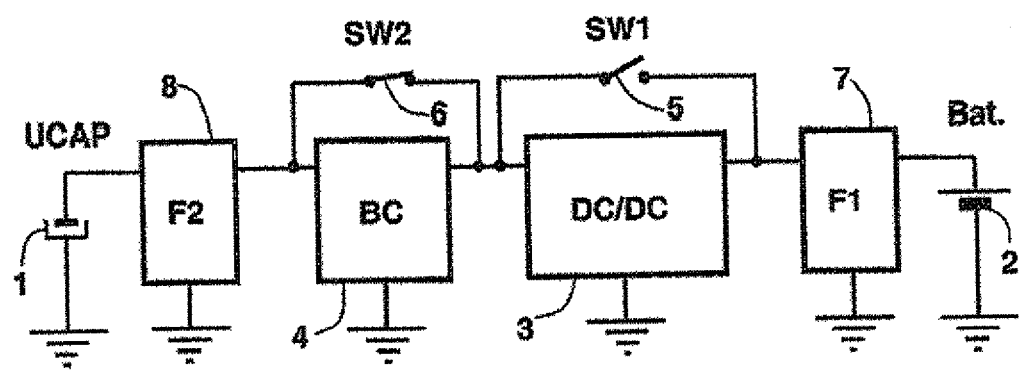

The method according to the invention, which is represented in FIGS. 2a and 2b, differs from the known method, represented in FIGS. 1a and 1b, substantially in that there is implementation of a stepdown voltage converter 4 between the reversible DC/DC converter 3 and the first energy storage element 1, instead of implementation of this converter between the second energy storage element 2 and the reversible DC/DC converter 3.

During the pre-charging (FIG. 2a), the reversible DC/DC converter 3 is put out of service, as symbolised by the closed first switch 5, whereas the second switch 6 between the input and the output of the stepdown voltage converter 4 is open.

Conversely, when the pre-charging is ended, the reversible DC/DC converter 3 is put back into service, and the stepdown voltage converter 4 is shunted symbolically by the closure of the second switch 6 (FIG. 2b).

The method which is represented in FIGS. 2a and 2b provides an improvement in the overall performance of the device in comparison with the method represented in FIGS. 1a and 1b.

In fact, since the voltage at the terminals of the first storage element 1 is higher than that at the terminals of the second storage element 2 in normal operation (FIG. 2b), for a given equivalent resistance provided by the stepdown voltage converter 4 put out of service, the current which passes through this equivalent resistance is lower in the method according to the invention, for a same power transferred, than it would be if this equivalent resistance were inserted in the reversible DC/DC converter 3 and the second storage element 2, as in the known method.

Figure 4:
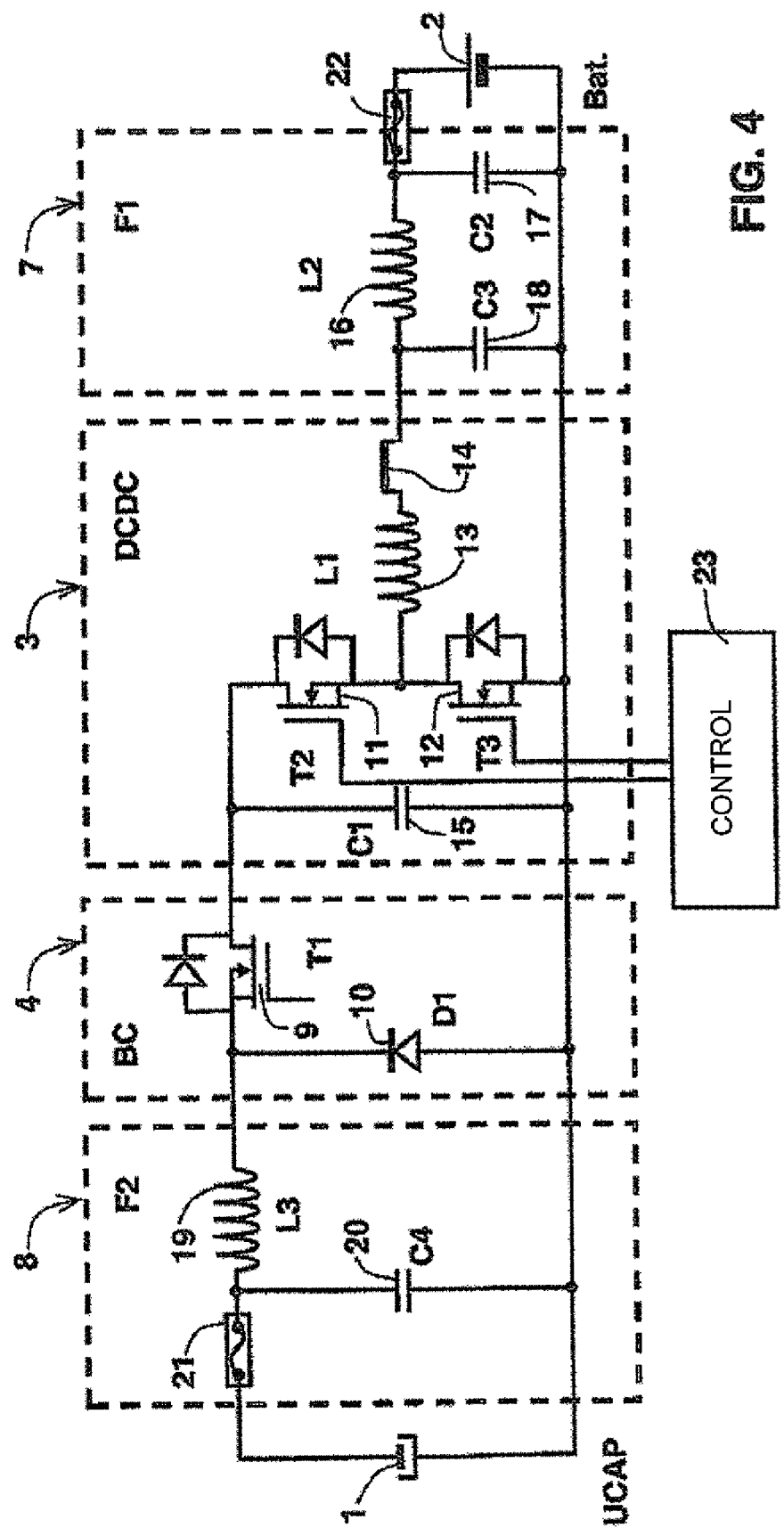
FIG. 4 represents the block diagram of a preferred embodiment of the device according to the invention, for charging an energy storage element from another element.

The detailed comparison in FIG. 4, giving the block diagram of a preferred embodiment of a device which implements the method represented in FIGS. 2a and 2b, with FIG. 3, which shows the block diagram of the device which implements the known method represented in FIGS. 1a and 1b, will make apparent other advantages of the invention in relation to the state of the art.

The stepdown voltage converter 4 is formed by a first static switch 9, and preferably a power transistor of the MOSFET type, arranged between the input and the output, and a diode 10, or another MOSFET, arranged in parallel on the output.

In comparison with the identical diagram of the stepdown voltage converter 4 shown in FIG. 3, connection of this converter 4 between the reversible DC/DC converter 3 and the ultracapacitor 1 provides an advantage which consists of protecting the reversible DC/DC converter 3 against an inverse voltage at the terminals of the ultracapacitor 1. However, it will be noted that in other embodiments, protection of this type can be assured by means of a fuse disposed at the input.

As shown clearly in FIG. 4, the reversible DC/DC converter 3 consists of a second and a third static switch 11, 12, which form a dividing bridge in parallel on the input terminals of the stepdown voltage converter 4. The mid-point of the bridge 11, 12 is connected to a first inductive resistor 13 which is in series with a shunt 14 (with a very low resistance value). The reversible DC/DC converter 3 additionally has a first capacitor 15 in parallel on the dividing bridge 11,12.

In comparison with the diagram in FIG. 3, the arrangement according to the invention of the reversible DC/DC converter 3 shown in FIG. 4 provides the advantage, during the pre-charging, of filtering the charging current through the low-pass filter constituted by the combination of the first inductive resistor 13 and the first capacitor 15, as well as the filtering obtained by a first filter 7 formed by a second inductive resistor 16, and a second and third capacitor 17,18 which are present in the two assemblies.

Consequently the size (and thus the cost) of this first filter 7 can be reduced in comparison with the first filter 7 used in the known arrangement shown in FIG. 3.

A second filter 8 is fitted in FIG. 4. This is a low-pass filter which is formed by a third inductive resistor 19 and a fourth capacitor 20. In comparison with the assembly in FIG. 3, this second filter 8 comprises a fuse 21 which is in series with the third inductive resistor 19, and protects fully the reversible DC/DC converter 4 in combination with the diode 10 at the output from the stepdown voltage converter 4.

During the pre-charging, the reversible DC/DC converter 3 is put out of service by keeping the second static switch 11 closed, and by keeping the third static switch 12 open by means of appropriate voltages at their control grids.

In these conditions, the mean intensity of the charging current is controlled by the resistance in the "closed" state of the second static switch 11, that of the first inductive resistor 13, the shunt 14, and the cyclical ratio of a command signal applied to the grid of the first static switch 9 of the stepdown voltage converter 4.

In normal operation, the reversible DC/DC converter 3 increases the voltage of the battery 2, and the charging current of the ultracapacitor 1 is controlled by controlling suitably the alternate opening and closure of the second and third static switches 11,12, by means of command signals applied to their grids.

The above-described commanded control functionality of the second and third static switches 11,12 by means of command signals permits charging of the ultracapacitor 1 by a battery current with relatively low intensity. It is thus possible to charge the ultracapacitor 1 by means of a battery 2 in a poor state of charge, and to start the thermal engine by means of the charged ultracapacitor 1, despite the deficient battery.

In the normal operation mode, the stepdown voltage converter 4 is put out of service by keeping the first static switch 9 closed by means of the voltage required at its grid.

The resistance in series, with the reversible DC/DC converter 3 in operation, which the stepdown voltage converter 4 out of service has, is therefore the resistance in the "closed" state or "passing resistance" of the first static switch 9.

As already stated, the voltage in this part 4 of the assembly is higher than it was in the prior version. For the same transferred power, the intensity which circulates in the passing resistance 9 is thus lower, and consequently the energy losses are lower.

For a similar reason, the losses in the device according to the invention when the system is on standby, in other words when all the static switches 9,11,12 are open, are also lower than in the known assembly, since resistance is added in the part of the circuit which has the strongest potential.

It will be appreciated that the invention is not limited simply to the preferred embodiments previously described.

In particular, as a variant, the overall performance of the system is increased, at the expense of an increase in the complexity of the control, by replacing the diode 10 in parallel on the output terminals of the stepdown voltage converter 4 by a transistor, so as to reduce losses during pre-charging (synchronous rectification).

The invention thus incorporates all the possible variant embodiments, provided that these remain within the context defined by the following claims.

The invention claimed is:

1. A charging device for charging an ultracapacitor (1) from a battery (2), said ultracapacitor (1) having a first nominal direct service voltage and said battery (2) having a second nominal direct service voltage lower than said first nominal direct service voltage, said charging device comprising:

- a reversible DC/DC converter (3) arranged between said ultracapacitor (1) and said battery (2);
- a stepdown voltage converter (4) arranged between said DC/DC converter (3) and said ultracapacitor (1), said stepdown voltage converter (4) formed by a first static switch (9) arranged between input and output terminals of said stepdown voltage converter (4) and by a diode (10) arranged in parallel to said output terminals of said stepdown voltage converter (4); and
- switching (11, 12, 9) and control (23) means provided for putting into service said stepdown voltage converter (4) and putting out of service said DC/DC converter (3) when a charging voltage of said ultracapacitor (1) is lower than said second nominal direct service voltage, and for putting out of service said stepdown voltage converter (4) and putting into service said DC/DC converter (3) when the charging voltage of said ultracapacitor (1) is equal to or greater than said second nominal direct service voltage;
- said DC/DC converter (3) comprising a first inductive resistor (13), a shunt (14), a first capacitor (15) and second and third static switches (11, 12) both of which form a dividing bridge in parallel to said input terminals of said stepdown voltage converter (4);
- a mid-point of said bridge being connected to said first inductive resistor (13) in series with said shunt (14) and by said first capacitor (15) in parallel to said dividing bridge.

2. The charging device according to claim 1, further comprising a first filter (7) arranged between said battery (2) and said DC/DC converter (3), and a second filter (8) arranged between said stepdown voltage converter (4) and said ultracapacitor (1).

3. The charging device according to claim 2, wherein said first filter (7) is a π filter formed by a second inductive resistor (16), and a second and third capacitor (17,18).

4. The charging device according to claim 2, wherein said second filter (8) is a low-pass filter formed by a third inductive resistor (19) and a fourth capacitor (20).

5. The charging device according to claim 4, wherein said first and second filters (7, 8) each comprise a fuse (22, 21) which is in series with said second and third inductive resistors (16, 19).

* * * * *